(12) United States Patent
Li

(10) Patent No.: US 7,960,962 B2
(45) Date of Patent: Jun. 14, 2011

(54) SOFT-START CIRCUIT

(75) Inventor: Hai-Po Li, Wuxi (CN)

(73) Assignee: Green Solution Technology Co., Ltd., Taipei County (TW)

( * ) Notice: Subject to any disclaimer, the term of this patent is extended or adjusted under 35 U.S.C. 154(b) by 128 days.

(21) Appl. No.: 12/385,911

(22) Filed: Apr. 23, 2009

(65) Prior Publication Data

US 2010/0066344 A1   Mar. 18, 2010

(30) Foreign Application Priority Data

Sep. 17, 2008   (TW) ................................ 97135542 A

(51) Int. Cl.
*G05F 3/16* (2006.01)
*G05F 3/20* (2006.01)

(52) U.S. Cl. ........................................ 323/315; 323/317

(58) Field of Classification Search .................. 323/282, 323/371, 315–317
See application file for complete search history.

(56) References Cited

U.S. PATENT DOCUMENTS

| | | | | |
|---|---|---|---|---|
| 6,525,517 | B1 * | 2/2003 | Hojo et al. | 323/316 |
| 6,815,938 | B2 * | 11/2004 | Horimoto | 323/351 |
| 7,088,078 | B2 * | 8/2006 | Liu | 323/207 |
| 2004/0027106 | A1 * | 2/2004 | Martins | 323/282 |
| 2007/0030709 | A1 * | 2/2007 | Kitagawa | 323/315 |

* cited by examiner

*Primary Examiner* — Adolf Berhane
*Assistant Examiner* — Jue Zhang
(74) *Attorney, Agent, or Firm* — Rosenberg, Klein & Lee

(57) ABSTRACT

The present invention discloses a soft-start circuit having a reference signal generator, a first current generator, a second current generator, and a soft-start capacitor. The reference signal generator generates a first signal and a second signal. The first current generator generates a first current according to the first signal, and the second current generator generates a second current according to the second signal. The soft-start capacitor is coupled to the first current generator and the second current generator, and charged by a current difference of the first current and the second current to generate a soft-start signal.

7 Claims, 4 Drawing Sheets

SOFT-START CIRCUIT

BACKGROUND OF THE INVENTION

1. Field of the Invention

The present invention relates to a soft-start circuit, and more particularly to a soft-start circuit for charging a current source by using a current difference.

2. Description of Related Art

In general, a power supply device will output a large current to an output terminal of the power supply device while being just started, and such a large current may damage a load or components coupled to the load. To avoid the aforementioned damage when the power supply device is just started, the power supply device controls the output energy at the beginning of a startup to rise gradually until the power supply device works normally, so as to prevent possible damage to circuits coupled to the power supply device, and this type of arrangement is called a soft start.

A pulse width modulation controller achieves the soft-start effect by increasing the working cycle gradually from the beginning, and thus the power supply device includes a voltage source that is increased with time and used for a soft-start control.

With reference to FIG. 1A for a schematic circuit diagram of a conventional soft-start circuit, the soft-start circuit includes a current mirror 10, a P-type bipolar transistor 15, a soft-start capacitor C1 and a reset switch 20. The current mirror 10 is coupled to a working power source VDD, a bias voltage source Vbias, and the P-type bipolar transistor 15, for supplying a current Ie (which is an emitter current) to the P-type bipolar transistor 15. The current Ie flowing through the P-type bipolar transistor 15 is divided into a base current Ib and a collector current Ic, wherein Ib/Ie is equal to $1/(1+\beta)$, and $\beta$ is the current gain of the P-type bipolar transistor 15. The soft-start capacitor C1 is coupled to a base of the P-type bipolar transistor 15, and the base current Ib is used for performing a charging to supply a soft-start voltage SS that increases with time. The reset switch 20 receives a soft-start control signal XEN, such that when the circuit is started, the soft-start control signal XEN is pulled low to turn off the reset switch 20, and the soft-start voltage SS rises with time. If the circuit needs to be started again, the soft-start control signal XEN will be pulled high to discharge electric charges stored in the soft-start capacitor C1 for the use of a next soft-start.

Since the $\beta$ value of the bipolar transistor increases with a rise of temperature and decreases with a drop of temperature, the soft-start time of the soft-start circuit as shown in FIG. 1A is affected significantly by ambient temperature. With reference to FIG. 1B for a simulated voltage curve of a soft-start voltage SS of a soft-start circuit as depicted in FIG. 1A and situated at different temperatures, the difference among time points of t1, t2, t3, the soft-start voltage SS reaching a soft-start termination voltage Se at temperatures T1, T2, T3 is very large. In the simulation, the difference of the soft-start time between a high temperature of 125° C. and a low temperature of −40° C. is approximately three times, and thus the error of the soft-start time of a soft-start circuit as shown in FIG. 1A does not fall into an acceptable range.

With the same soft-start time requirement, a smaller current source can be used for reducing the size of a charging capacitor to facilitate building the capacitor into an integrated circuit. With reference to FIG. 2A for a schematic circuit diagram of another conventional soft-start circuit, the soft-start circuit includes a current mirror 10, a Darlington circuit 25, a soft-start capacitor C2, and a reset switch 20. Compared with the P-type bipolar transistor 15 of the circuit as shown in FIG. 1A, the current Ib' outputted from the Darlington circuit 25 is equal to $1/(1+\beta)^2$ times of the Ie provided by the current mirror 10, and thus the size of the soft-start capacitor C2 can be reduced to $1/(1+\beta)$ times of the soft-start capacitor C1 as shown in FIG. 1A. However, the Darlington circuit 25 also amplifies the effect of the ambient temperature. With reference to FIG. 2B for a simulated voltage curve of a soft-start voltage SS of a soft-start circuit as depicted in FIG. 2A and situated at different temperatures, the simulation is conducted at temperatures T1, T2 (and current may leak at the temperature T3 since the charging current is too small, so that the Darlington circuit 25 cannot be started at this temperature in the simulation), and the soft-start voltage SS reaches the soft-start termination voltage Se at the time points of t4, t5 respectively. According to the aforementioned charging current formula, the variation of the charging current of the Darlington circuit 25 with temperature is the square of that of a single bipolar transistor, Thus, the soft-start circuit as shown in FIG. 2A varies with temperature to a greater extent, and the error of the soft-start time still does not fall within an acceptable range.

SUMMARY OF THE INVENTION

In view of the foregoing shortcomings of the prior art, the present invention uses a current difference of two current sources as a current source to charge a soft-start circuit in order to obtain a smaller charging current and further reduce the capacitance for the soft-start. In addition, the temperature coefficients of the current pair of the two current sources are not equal, and thus the property of this circuit is used for compensating the influence of temperature to the charging current, and the error of the soft-start time can fall within an acceptable range.

To achieve the foregoing objective, the present invention provides a soft-start circuit comprising a reference signal generator, a first current generator, a second current generator, and a soft-start capacitor. The reference signal generator generates a first signal and a second signal. The first current generator generates a first current according to the first signal, and the second current generator generates a second current according to the second signal. The soft-start capacitor is coupled to the first current generator and the second current generator for performing an electric charging to generate a soft-start signal according to a current difference of the first current and the second current.

The temperature coefficient of the first current is greater than the temperature coefficient of the second current, and thus the temperature compensation effect can be achieved.

The above and other objects, features and advantages of the present invention will become apparent from the following detailed description taken with the accompanying drawing.

DETAILED DESCRIPTION OF PREFERRED EMBODIMENTS

Figure 3:
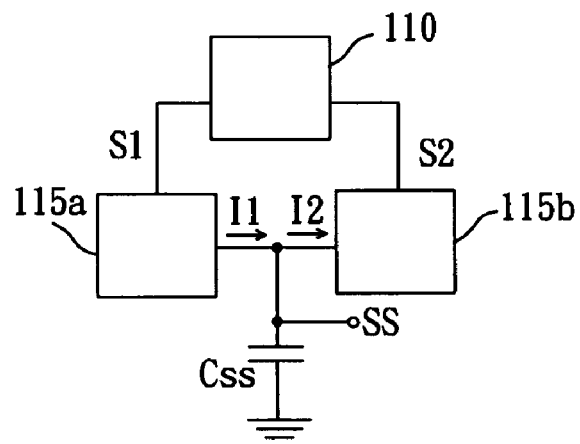
FIG. 3 is a functional block diagram of a soft-start circuit of the present invention.

With reference to FIG. 3 for a functional block diagram of a soft-start circuit in accordance with the present invention, the soft-start circuit comprises a reference signal generator 110, a first current generator 115a, a second current generator 115b, and a soft-start capacitor Css. The reference signal generator 110 generates a first signal S1 and a second signal S2. The first current generator 115a generates a first current I1 according to the first signal S1, and the second current generator 115b generates a second current I2 according to the second signal S2. The soft-start capacitor Css is coupled to the first current generator 115a and the second current generator 115b for performing a charging to generate a soft-start signal SS according to the current difference of the first current I1 and the second current I2. Since the first current I1 and the second current I2 are opposite in direction, therefore a smaller soft-start charging current can be achieved to reduce the size of the soft-start capacitor Css effectively.

Figure 1A:
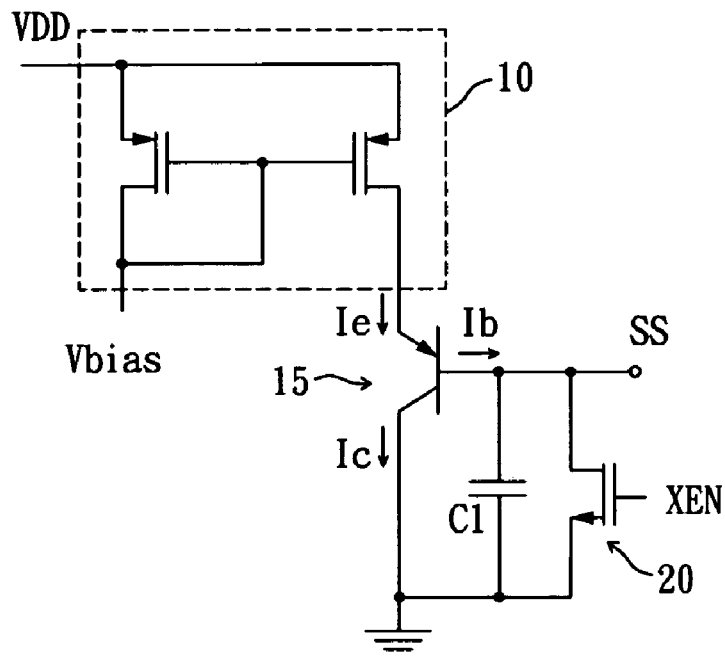
FIG. 1A is a schematic circuit diagram of a conventional soft-start circuit.
Figure 1B:
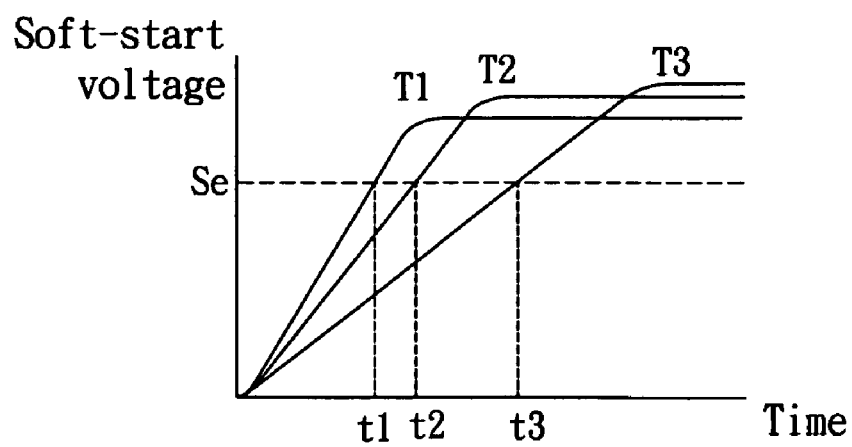
FIG. 1B is a simulated voltage curve of a soft-start voltage SS of a soft-start circuit as depicted in FIG. 1A and situated at different temperatures.
Figure 2A:
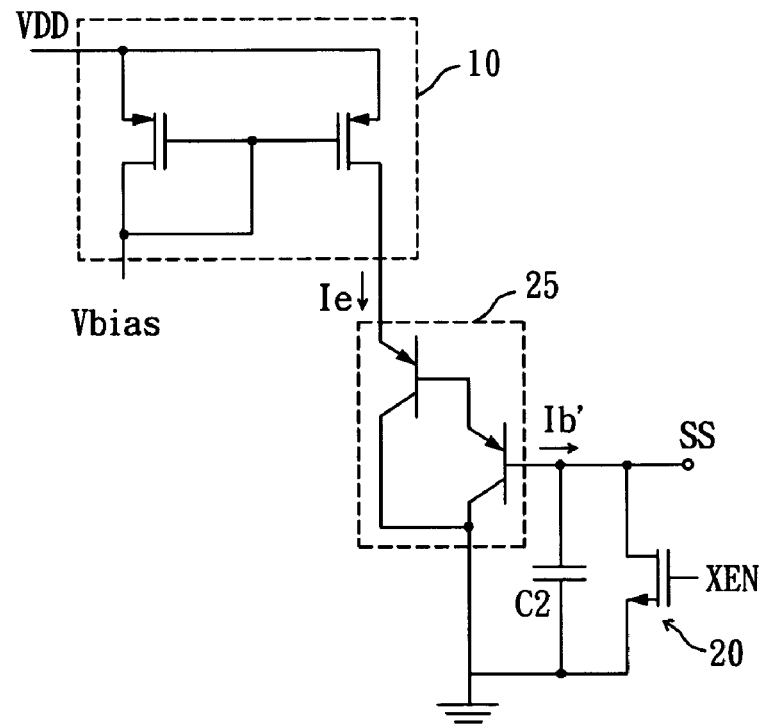
FIG. 2A is a schematic circuit diagram of another conventional soft-start circuit.
Figure 2B:
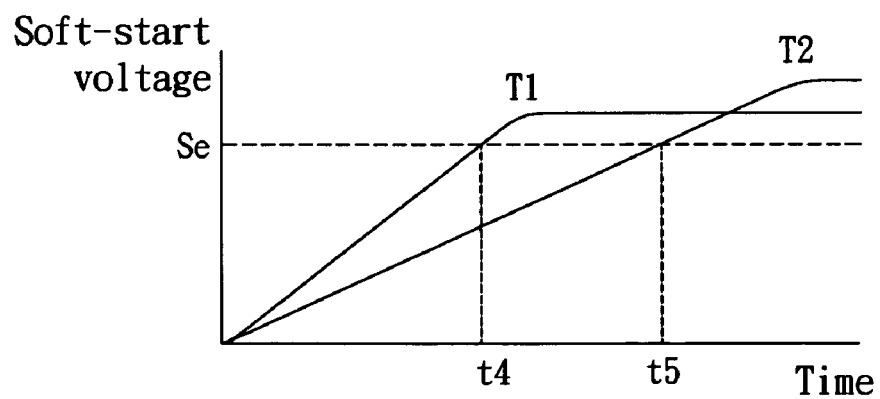
FIG. 2B is a simulated voltage curve of a soft-start voltage SS of a soft-start circuit as depicted in FIG. 2A and situated at different temperatures.
Figure 4A:
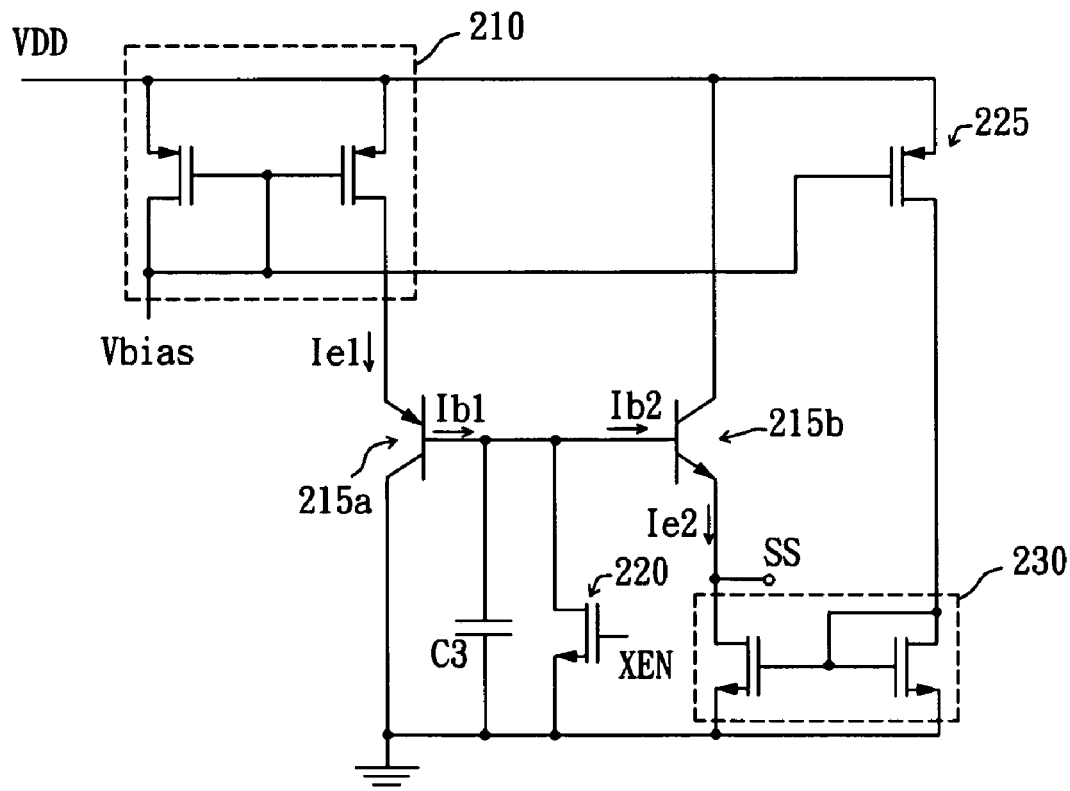
FIG. 4A is a schematic view of a soft-start circuit in accordance with a preferred embodiment of the present invention.

With reference to FIG. 4A for a schematic view of a soft-start circuit in accordance with a preferred embodiment of the present invention, the soft-start circuit comprises a reference signal generator, a first current generator 215a, a second current generator 215b, and a soft-start capacitor C3. The reference signal generator comprises a first current mirror 210 and a second current mirror 230 for generating a first current signal Ie1 and a second current signal Ie2 and the first current mirror 210 and the second current mirror 230 is coupling with each other through the transistors 225, such that the first current signal Ie1 and the second current signal Ie2 are substantially equal. The first current generator 215a generates a first current Ib1 according to the first current signal Ie1, and the second current generator 215b generates a second current Ib2 according to the second current signal Ie2. The soft-start capacitor C3 is coupled to the first current generator 215a and the second current generator 215b. In this preferred embodiment, the first current generator 215a is a P-type bipolar transistor, and an emitter of the P-type bipolar transistor is coupled to the reference signal generator, and the generated first current Ib1 is equal to Ie1/(1+$\beta_p$); and the second current generator 215b is an N-type bipolar transistor, and an emitter of the N-type bipolar transistor is coupled to the reference signal generator, and the generated second current Ib2 is equal to Ie2(1+$\beta_n$). Therefore, the charging current of the soft-start capacitor C3 is equal to $$Ib1 - Ib2 = \frac{Ie1}{(\beta_p + 1)}\left(1 - \frac{\beta_p + 1}{\beta_n + 1}\right),$$

wherein if Ie1=Ie2, then the charging current of the soft-start capacitor C3 is a current difference of the first current Ib1 and the second current Ib2, and the first current Ib1 is greater than the second current Ib2. Compared with the soft-start circuit as shown in FIG. 1A, the charging current is reduced to (1−$\beta$p/$\beta$n) times, and thus the soft-start capacitor C3 is (1−$\beta$p/$\beta$n) times of the prior art if the same soft-start time is required, and the size of the soft-start capacitor C3 can be reduced substantially.

The soft-start circuit further comprises a reset switch 220 controlled by a soft-start control signal XEN. If it is necessary to start the circuit again, the soft-start control signal XEN will be pulled to a high level for discharging electric charges stored in the soft-start capacitor C3 for the use of a next soft-start.

In this preferred embodiment, the soft-start signal SS is an emitter voltage of an N-type bipolar transistor of the second current generator 215b. Compared with the electric potential of the soft-start capacitor C3, the electric potential of the base-emitter (Vbe) is missing, and thus the soft-start signal SS provided by the soft-start circuit will rise from zero potential after a delay time in order to prevent an operating error of the circuit while internal components are still unstable at the startup. In this preferred embodiment, the level adjustment of the soft-start signal SS may be achieved through the second current generator 215b; however, in practice the circuit may adjust the level of the soft-start signal SS through a level shifter circuit coupled to the soft start capacitor C3.

To assure a positive value for the charging current, the selected $\beta$n value of the N-type bipolar transistor must be greater than the $\beta$p value of the P-type bipolar transistor.

TABLE 1

| $\beta$ Values of the Bipolar Transistor (with a base current range of 1 nA~10 uA) | | | | | | |
|---|---|---|---|---|---|---|
| | Type | | | | | |
| | NPN50 | | | PNP50 | | |
| | Lattice Direction | | | | | |
| Temperature | TT | SS | FF | TT | SS | FF |
| −40° C. | 7.7-7.5 | 6.55-6.41 | 8.61-6.85 | 5.87-5.06 | 5.0-4.38 | 6.73-5.71 |
| 25° C. | 16.2-15.3 | 13.8-13.1 | 18.6-17.4 | 9.72-7.62 | 8.31-6.67 | 11.1-8.51 |
| 125° C. | 36.1-30.5 | 31.2-26.8 | 40.8-33.9 | 15.8-10.6 | 13.7-9.44 | 17.8-11.7 |

In Table 1, the $\beta$ values of the P-type bipolar transistors (PNP50) and the N-type bipolar transistors (NPN50) of different lattice directions and temperatures are listed. Table 1 shows that the $\beta$ values of the N-type bipolar transistor are greater than the $\beta$ values of the P-type bipolar transistor in the same lattice direction.

Since the value of $$\frac{Ie1}{\beta_p + 1} \text{ in } \frac{Ie1}{\beta_p + 1}\left(1 - \frac{\beta_p + 1}{\beta_n + 1}\right)$$

decreases with temperature, therefore the value of $$\left(1 - \frac{\beta_p + 1}{\beta_n + 1}\right)$$

will increase with temperature to compensate the influence of the temperature. In other words, the temperature coefficient of the βn value of the N-type bipolar transistor is greater than the temperature coefficient of the βp value of the P-type bipolar transistor. The variation ratio of βn value of the N-type bipolar transistor increasing with temperature must be greater than that of the βp value of the P-type bipolar transistor increasing with temperature. According to Table 1, the βn value of the NPN50 (TT) rises from 7.7~7.5 to 36.1~30.5 when the temperature increases from −40° C. to 125° C., while the βp value of the PNP50 (TT) rises from 5.87~5.06 to 15.8~10.6, and the percentage change of the NPN50 (TT) is greater than that of the PNP50 (TT), and thus the soft-start circuit of this embodiment can achieve the temperature compensation effect.

Figure 4B:
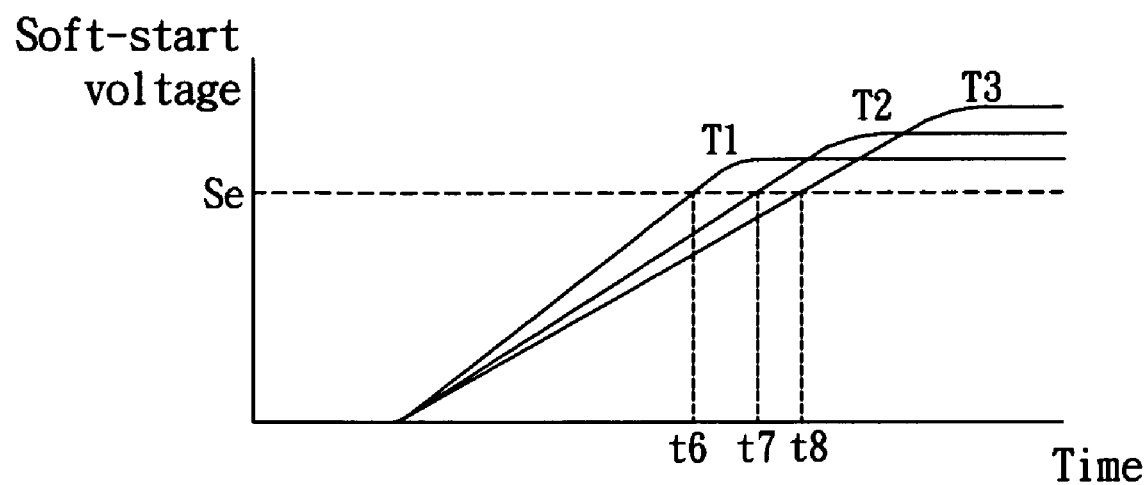
FIG. 4B is a simulated voltage curve of a soft-start voltage SS of a soft-start circuit as depicted in FIG. 4A and situated at different temperatures.

With reference to FIG. 4B for a simulated voltage curve of a soft-start voltage SS of a soft-start circuit as depicted in FIG. 4A and situated at different temperatures, the time points for the soft-start voltage SS to reach a soft-start termination voltage Se at the temperatures T1, T2, T3 are t6, t7 and t8 respectively and the time difference decreases, such that the error of the soft-start time can fall within an acceptable range.

Although the present invention has been described with reference to the preferred embodiments thereof, it should be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A soft-start circuit, comprising:
   a reference signal generator, for generating a first signal and a second signal;
   a first current generator, for generating a first current according to the first signal;
   a second current generator, for generating a second current according to the second signal; and
   a soft-start capacitor, coupled to the first current generator and the second current generator, for performing an electric charging to generate a soft-start signal according to a current difference of the first current and the second current, wherein the first current generator is a P-type bipolar transistor and the second current generator is an N-type bipolar transistor.

2. The soft-start circuit of claim 1, further comprising a level shifter circuit coupled to the soft-start capacitor for adjusting a level of the soft-start signal.

3. The soft-start circuit of claim 1, wherein the reference signal generator is a current mirror.

4. The soft-start circuit of claim 1, wherein an emitter of the P-type bipolar transistor is coupled to the reference signal generator, and an emitter of the N-type bipolar transistor is coupled to the reference signal generator.

5. The soft-start circuit of claim 4, wherein the N-type bipolar transistor has a β value greater than that of the P-type bipolar transistor.

6. The soft-start circuit of claim 4, wherein the N-type bipolar transistor has a temperature coefficient of a β value greater than that of the P-type bipolar transistor.

7. The soft-start circuit of claim 4, wherein the P-type bipolar transistor has a base current greater than that of the N-type bipolar transistor.

* * * * *